Feb. 8, 1927.
L. L. ARDIN
1,616,646
INTERNAL COMBUSTION TURBINE
Filed Nov. 30, 1920  8 Sheets-Sheet 1
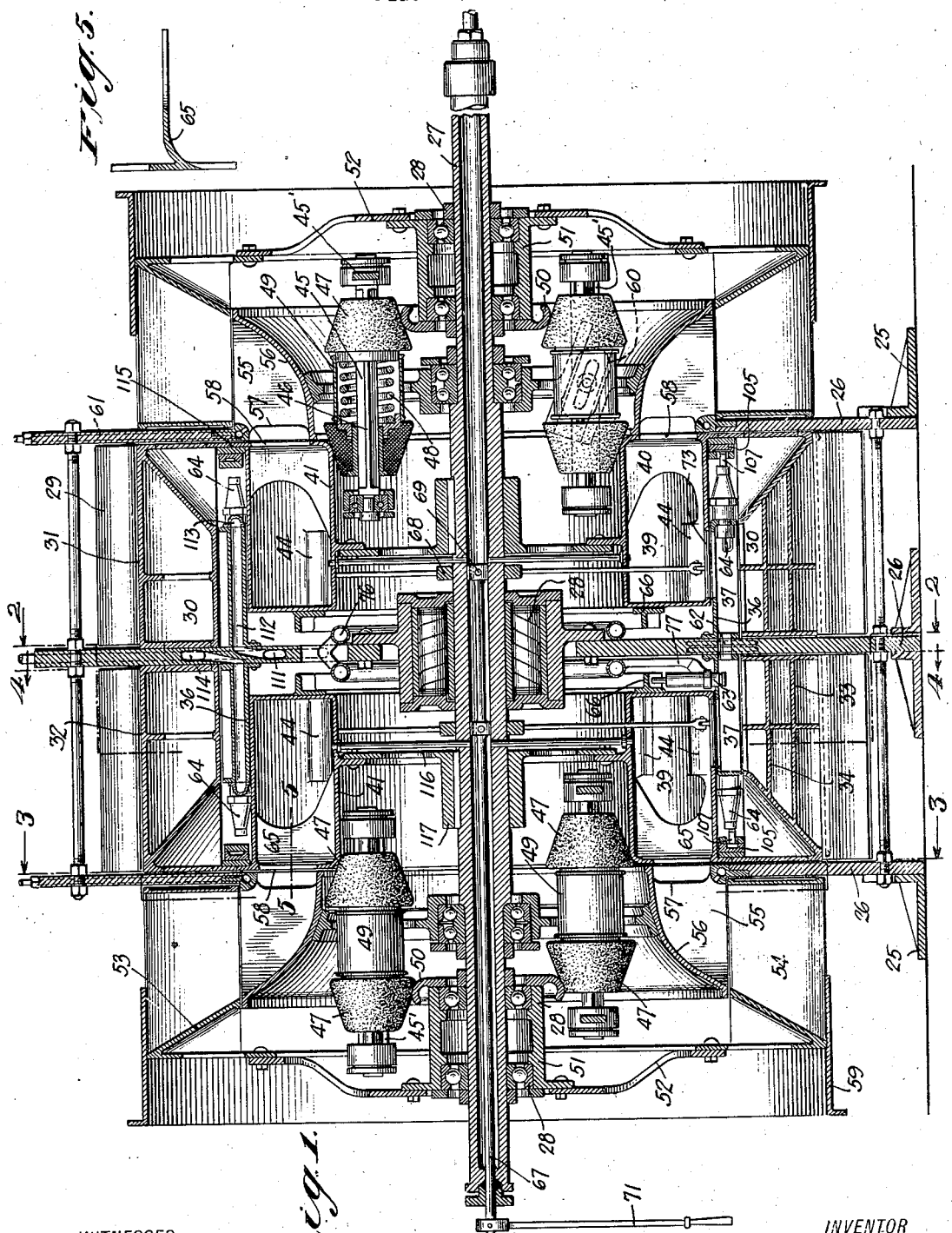
WITNESSES
INVENTOR
L. L. ARDIN
BY
ATTORNEYS

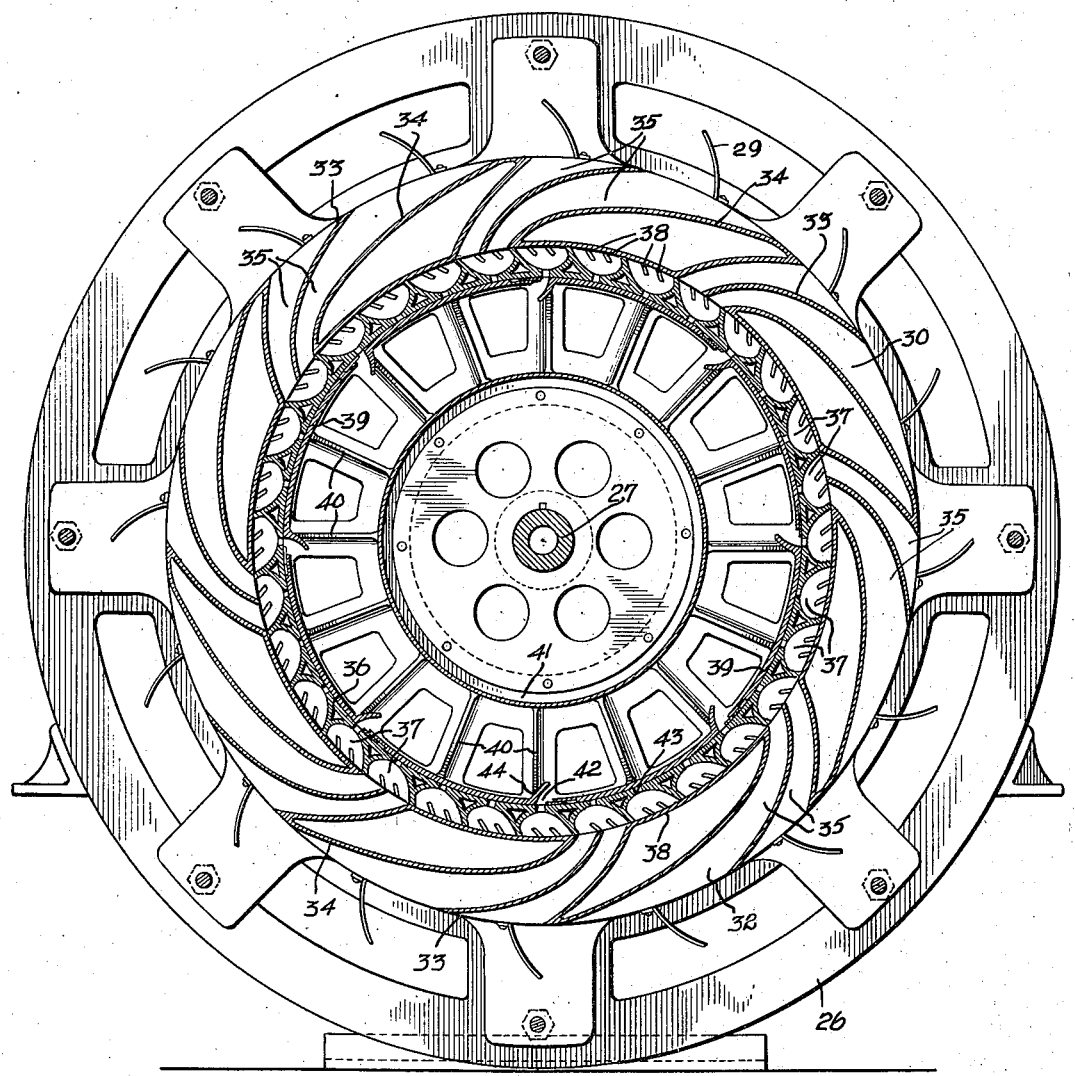

Feb. 8, 1927.
L. L. ARDIN
1,616,646
INTERNAL COMBUSTION TURBINE
Filed Nov. 30, 1920    8 Sheets-Sheet 3
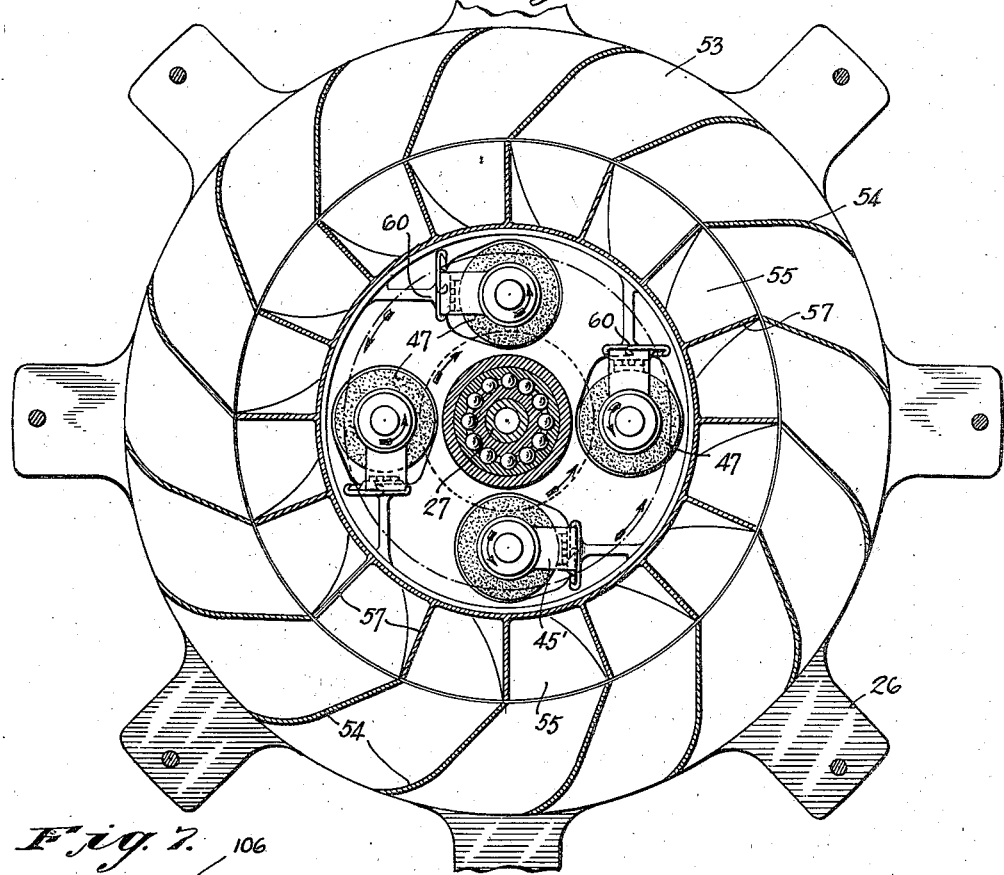
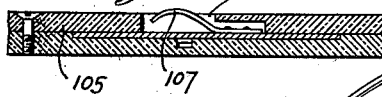
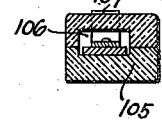
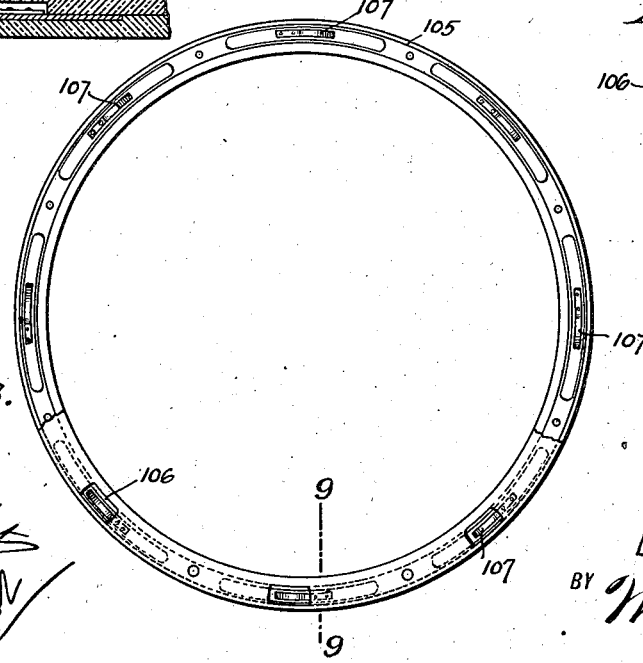
INVENTOR
L.L. ARDIN
BY
ATTORNEYS

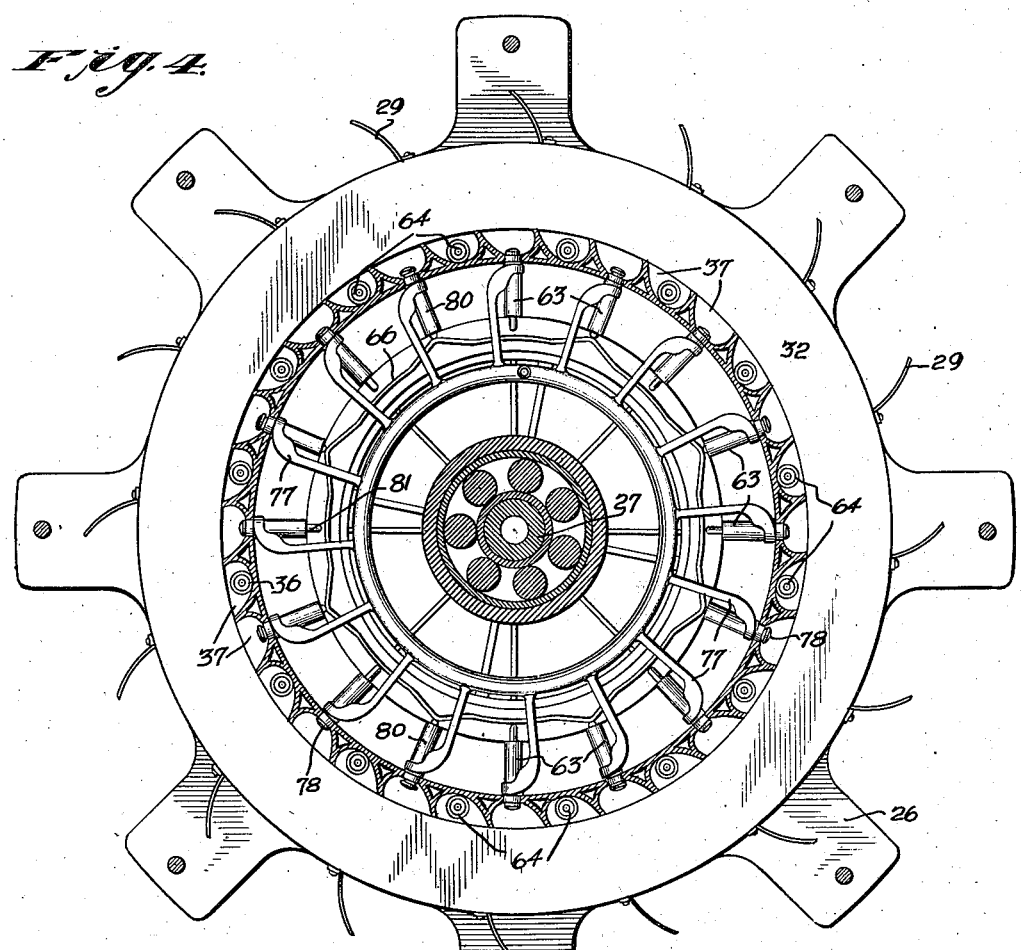
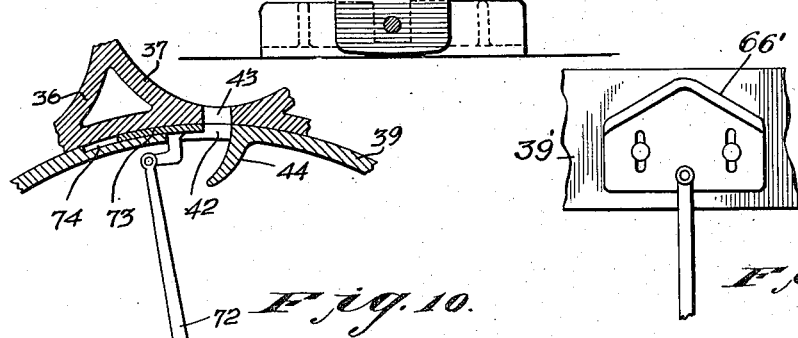
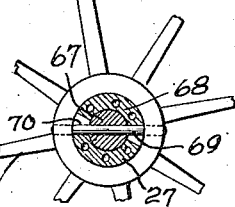

Feb. 8, 1927. 1,616,646
L. L. ARDIN
INTERNAL COMBUSTION TURBINE
Filed Nov. 30, 1920    8 Sheets-Sheet 5

WITNESSES

INVENTOR
L. L. ARDIN
BY
ATTORNEYS

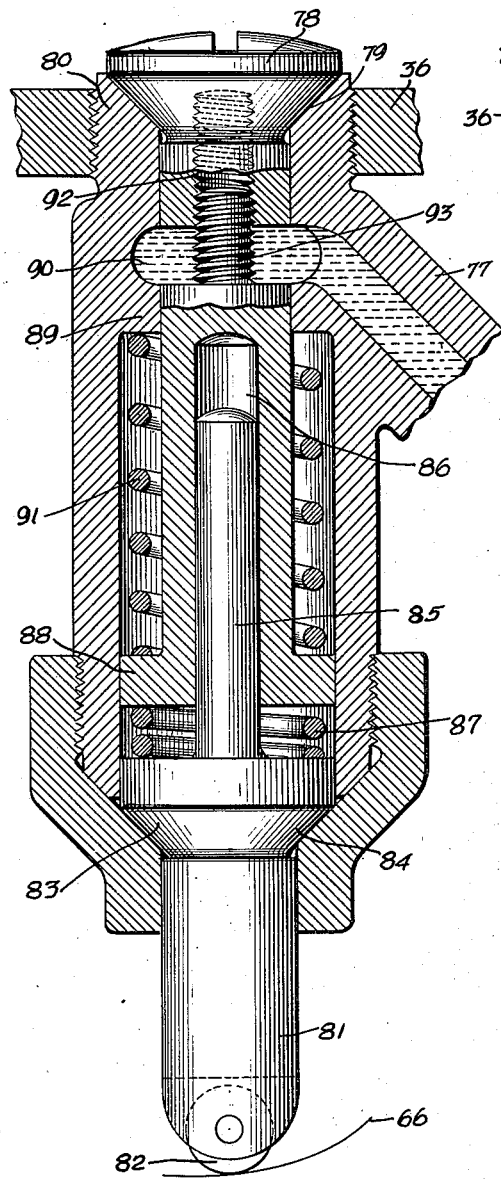
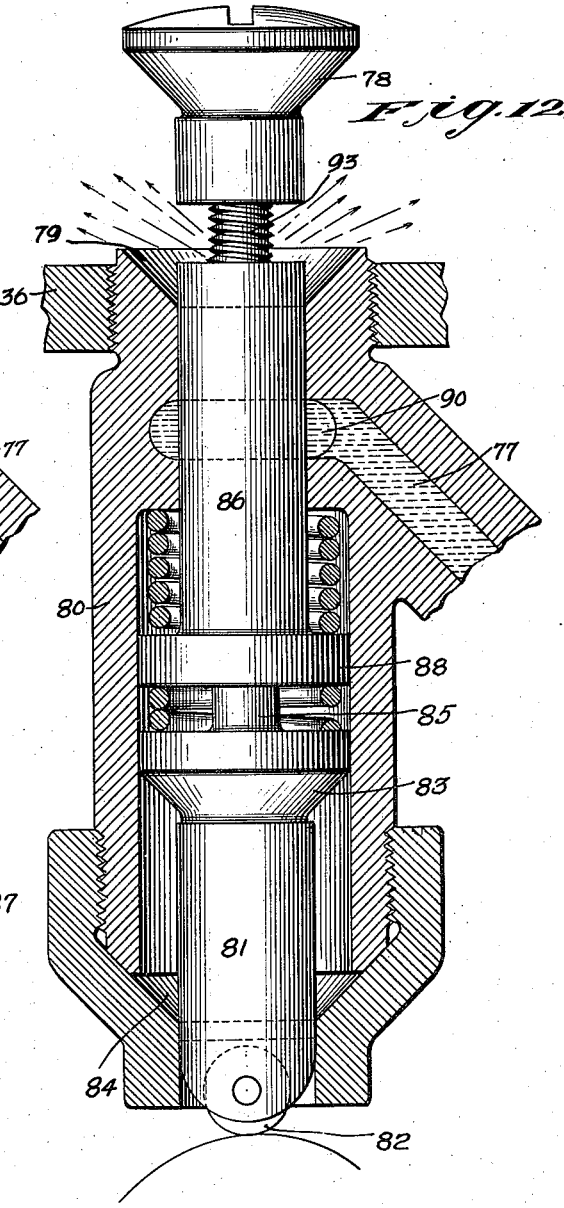

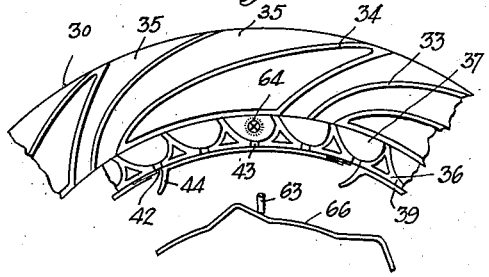
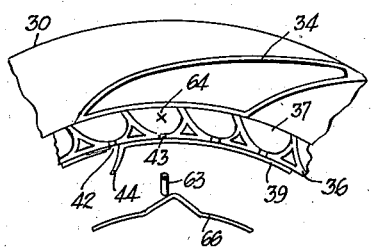
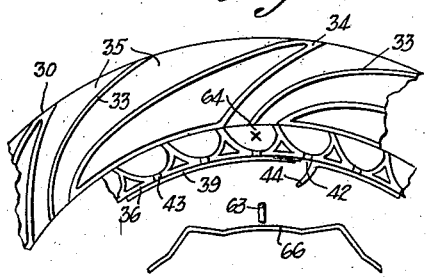
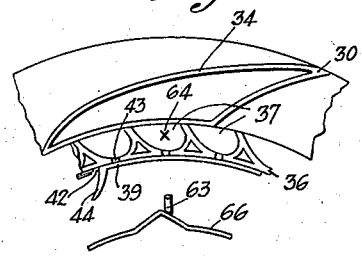
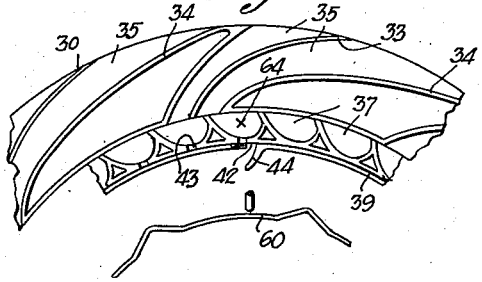
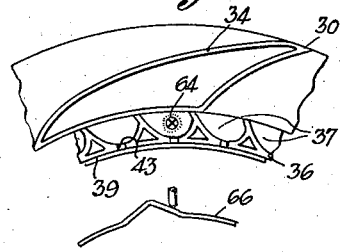

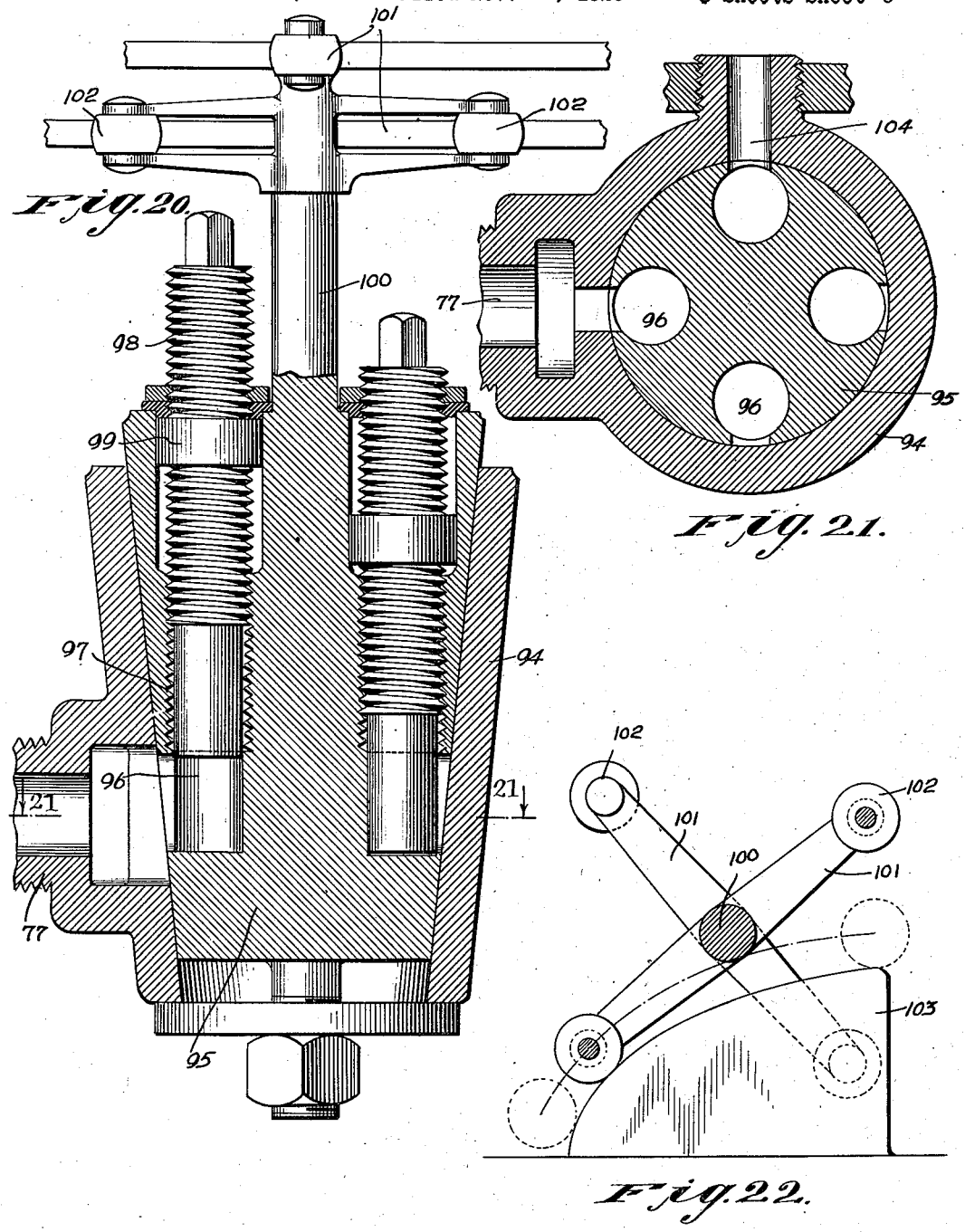

Patented Feb. 8, 1927.

1,616,646

UNITED STATES PATENT OFFICE.

LUCIEN LEOPOLD ARDIN, OF NEW YORK, N. Y.

INTERNAL-COMBUSTION TURBINE.

Application filed November 30, 1920. Serial No. 427,365.

My invention relates to an internal combustion engine, and aims to provide a device of this character in the nature of a turbine.

An object of the present invention is to provide an internal combustion engine in the nature of a turbine which shall include a casing and rotor movable with respect to each other, and which primarily, shall be cooled with such efficiency that no binding of the parts will result.

A further object of my invention is the construction of a device of this nature in which problems of lubrication shall be well-nigh eliminated, and A still further object of my invention is the construction of an internal combustion engine in which the charge may be properly introduced, its volume regulated, ignited, and exhausted in such a manner that no difficulty will be experienced in operation and production of power.

It will be understood that an explosive motor of this type, overcoming the defects as set forth in the preceding paragraph, will embody a form of motive power far superior to that now upon the market, in that flexibility of operation will be produced to such an extent that the smoothness of driving force will be absolutely continuous in contradistinction to the individual impacts which make themselves felt, even in multiple cylinder engines. Also it will be seen that a practical motor of the type to which my invention relates will embody flexibility to such an extent as to permit of practically the elimination of gear shifts, and with devices which must be utilized at the present time, to permit of the variation of speed as well as delivery of power within certain ranges between the driving and driven elements of a power plant of this type.

It will further be appreciated that incident to the construction of a turbine which will operate in this manner, that the following benefits will be derived;

Primarily, by virtue of the fact that no reciprocation takes place, that subsequent to the separating of the parts, no inertia will have to be overcome incident to reversing the direction of these parts, as is the case in reciprocating types of pistons. Thus, none of the power will have to be expended to cause a function producing no additional results.

Secondly, it will not be necessary to operate the parts to provide an expelling of the products of combustion, in that these products will practically be thrown off of their own volition.

Thirdly; as aforestated, lubrication will be reduced to a minimum by virtue of the fact that no binding of the parts will result, for the reason that parts with respect to each other are spaced from one another, although such spacing is reduced to a minimum to insure as tight a seal as is practical without sacrificing power; and Fourthly; that all of the noise commonly experienced as a part of the operation of an internal combustion engine, such as the sounds produced by the movement of the valve rocker arms, valve tappets, etc. will be entirely eliminated.

It will also be understood that although my turbine is primarily intended for use in connection with a highly volatile fuel, such as gasoline, that any suitable mixture permitting of an explosion, such as crude oil, kerosene, as well as a solid particle mixture presenting explosive qualities' may be used to advantage to produce an operation of the machine.

Further objects of my invention will appear in the annexed specification and drawings which latter present one practical embodiment of my invention, and in which Figure 1 is a sectional side view taken through a machine constructed in accordance with my invention, and along lines 1—1 of Figure 6.

Figure 2 is a sectional view taken along the lines 2—2 of Figure 1.

Figure 3 is a sectional view taken along the line 3—3 of Figure 1.

Figure 4 is a view similar to Figures 2 and 3 but taken along the line 4—4 of Figure 1.

Figure 5 illustrates in detail one of the elements forming a part of my motor, and is taken along the line 5—5 of Figure 1.

Figure 7 is an enlarged fragmentary sectional view of one of the elements forming a part of the ignition system.

Figure 8 is a side view of that portion of the device illustrated in Figure 7.

Figure 9 is an enlarged view taken along the line 9—9 of Figure 8.

Figure 10 is a fragmentary view of one of the air admission inlets.

Figures 11 and 12 illustrate one form of valve governing the admission of fuel into the explosion chambers.

Figures 13 to 18 are somewhat diagrammatic views of the parts showing the firing chambers and adjacent sections, the various steps of advance of the parts through one cycle of explosion, exhaust, scavenging, air admission, fuel admission and explosion.

Figure 19 is a fragmentary view of one of the details of the invention.

Figure 20 is an enlarged cross sectional view of another form of valve which may be used to advantage.

Figure 21 is a sectional view taken along the line 21—21 of Figure 20, and

Figure 22 is an end view of the device as illustrated in Figure 20.

Figure 6:
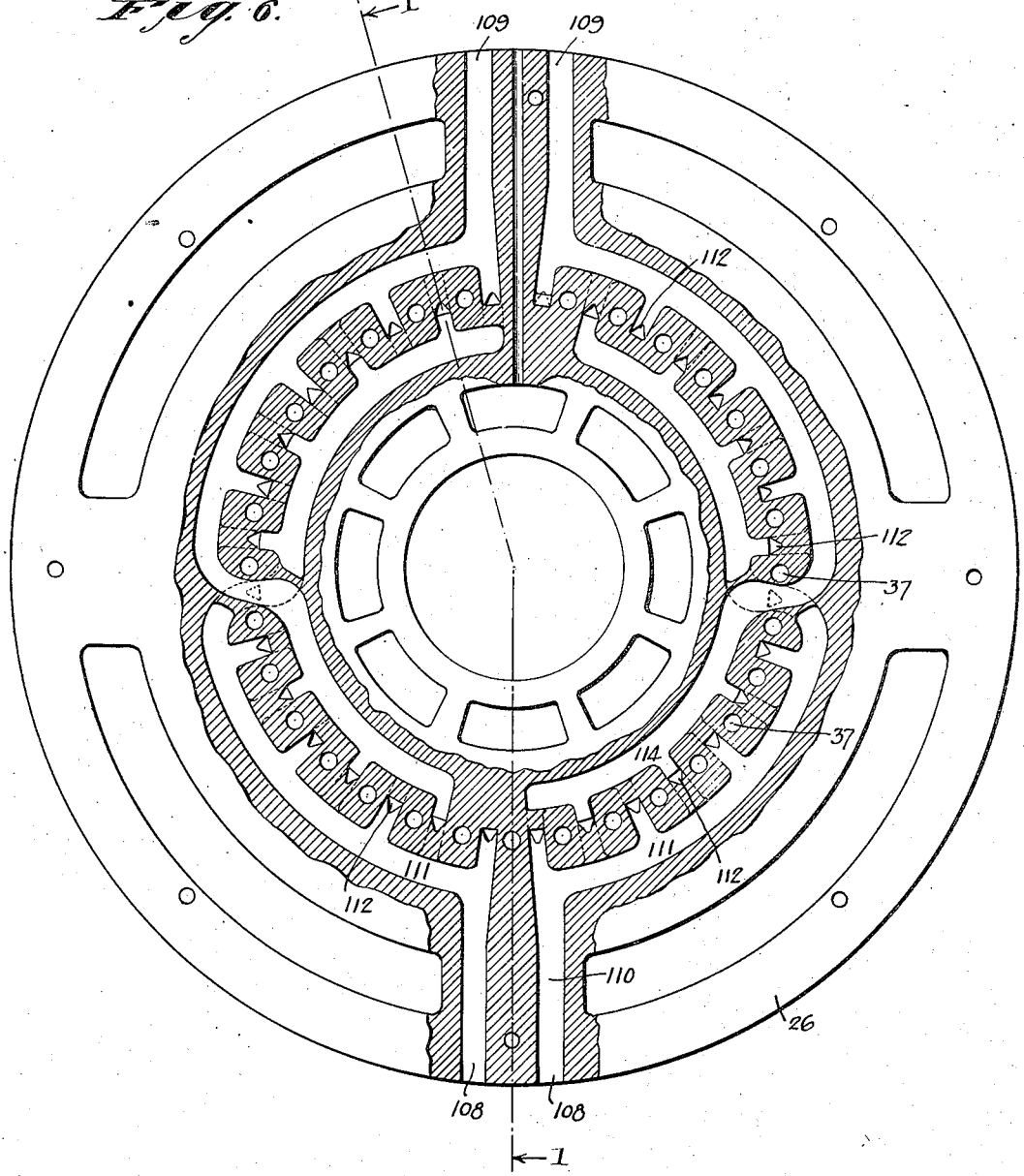
Figure 6 is a fragmentary view showing the water cooling system which may be employed to advantage in connection with the engine.
Figure 23:
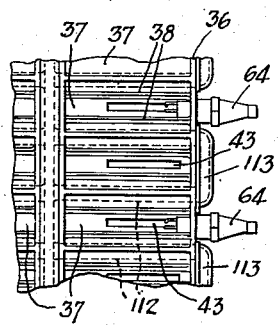
Figure 23 is a fragmentary view showing in detail the flow of the cooling medium.

Referring now more particularly to Figure 1, it will be seen that the turbine includes a base 25, of any suitable type, which serves to support the entire device, and which has attached to it a plurality of annular plates 26 which, in the embodiment illustrated, are three in number. A shaft 27 extends centrally of the entire device, and mounts bearings 28. Fixedly positioned between the plates 26, which are held against rotation, are deflector plates 29 for a purpose hereinafter more fully specified, and a rotor 30 also lies between the plates and is of a circumference permitting of its outer edge to clear the deflector plates 29.

The rotor includes two half sections 31 and 32 respectively, which are identical in construction, and operate in unison. Each of these sections comprises a series of vanes 33, and baffles 34, it being noted, in the embodiment illustrated, that one baffle is arranged between each of the vanes, whereby a series of ports 35 are provided, which latter have their outer ends terminating at a point adjacent the outer edges of the rotor, the inner ends of which terminate adjacent the inner edges of the rotor 30. In this connection it is to be noted that their faces converge toward each other, so that the ports 35 will be tapered throughout their entire length for a purpose hereinafter more fully specified.

Now with a view of providing firing chambers, an annular member 36 is utilized, which includes a series of pockets forming firing chambers 37 in its outer face, each of said chambers being preferably provided with transversely extending vanes 38 for a purpose hereinafter specified.

It is to be noted, as in connection with the member 36, that the structure specified is, in the embodiment illustrated, divided into two similar sections, one circumscribed by each of the sections 31 or 32 or the rotor, and it will be understood that the parts in operation will act similarly in each one of these divisions.

Rotatably mounted upon the bearings 28, in a manner hereinafter specified, are a pair of drum shaped members 39, which may be suitably strengthened by means of radially extending ribs 40, and an inner drum portion 41. One of these members is mounted in line with each of the sections aforementioned, and is formed with a series of openings 42, in its outer face, which openings are adapted to be capable of aligning with openings 43 in the base of each of the pockets 37, it being noted that a deflector vane 44 is conveniently positioned adjacent each of the openings 42 forming a part of the drum 39.

From the foregoing it will be seen that by virtue of the fact that the member providing the firing chambers is attached to the plates 26, that the firing chambers are, in the embodiment illustrated, held against any movement. However, the drums 39 and rotor 30 are rotatably mounted upon the bearings 28 by virtue of the interposed rollers hereinafter fully described. Thus it will be seen that an explosion in any of the firing chambers 37 would result in a rotation of the rotor 30 by virtue of the impact against the vanes of the same, it being noted that the increasing area of these latter ports would serve to promote the escape of these products of combustion, and assuming that the drums were affixed to the rotor section, it will be appreciated that the drums would rotate therewith.

Now referring more particularly to the structure permitting of the introduction of air into the cylinders, which air will act primarily as an element producing combustion, as well as a scavenging agent, for the products of combustion, it will be noted that the rollers referred to in the preceding paragraph each preferably include a shaft 45 formed with key-ways 46, upon which conical contact members 47 are slidably mounted, each of the rollers having its pair of contact members, forced in opposed direction by means of a compression spring 48, which may be encircled by a suitable sleeve 49. Each of the contact members 47 bears against one of the parts of the apparatus, as has been illustrated in Figure 1, the inner one conveniently bearing against the outer edge of the drum portion 41, the outermost contact member engaging an annular track member 50 forming a part of the collar 51, rotatably mounted upon one of the bearings 28. Thus, each of the drums 41 has what might be termed a floating contact with the rollers, and rotation will be imparted from the former to the latter, and thus to the collar 51 upon the drum being rotated.

It is to be noted that, in the embodiment illustrated, where two drums are utilized, that two annular series of rollers are provided, one for each of the drums, which latter impart rotation as specified to their respective collars 51, and by virtue of the tendency of the contact members to be forced in opposite directions along the shaft 45, it will be seen that these contact members are at all times held in intimate frictional engagement with the driving and driven members.

Each of the collars 51 conveniently carries a series of radially extending arms 52, the outer ends of which serve to supsuport a centripetal fan, which latter includes inclined outer side walls, and an annular series of vanes 54 arranged at an angle to the radial.

Referring now more particularly to Figure 3, it will be seen that rotation of the fan will be transmitted in a direction opposite to that of the rotation imparted by the rotor to the drum, with which it is associated, so that upon the drum rotating in the manner specified, air will be thrown into the pockets formed between the vanes, and be thrown into the stationary passages 55 formed by providing a funnel shaped member 56 below the fan, which funnel shaped member may also conveniently include a series of radially extending ribs 57, which latter are inclined so as to form a continuation of the side walls 53, thus directing the air from the fan vanes 55 inwardly into the interior of the drum members, including the drum 41 and drum shaped members 39 by virtue of the openings 58 formed in the outer side walls thereof.

Thus it will be appreciated, the firing chambers remaining stationary as specified, and the drum members rotating, that air will be forced into the firing chambers upon the openings 42 and 43 of these respective members aligning one with the other. Also it will be understood that the amount of air to be introduced into the pockets, will vary according to atmospheric conditions, and also for other reasons, and with a view of providing regulating means which will permit of the varying of the supply of air, annular bands 59 may be utilized, which latter circumscribe the free ends of the vanes 54 of the centripetal fans. Thus upon the bands being moved inwardly, or drawn outwardly, it will be seen that the cross sectional area of the opening provided between the inner edges thereof and the inner edges of the vanes will be varied to permit of the throwing of more or less air into each of the vanes.

To provide means which will also permit of the varying of speed of rotation of each of the vanes irrespective of the speed of the rotors and drum members, each of the rollers has its shaft 45 secured to a bracket 45' movably secured in an inclined slide way 60 within which it may be secured by any suitable locking means. It will be appreciated, due to the angle of inclination of the contact portions 47, that a movement of the rollers bodily within the slide way 60 will not effect the engagement between the rollers, and the driving and driven members, but will merely serve as a variable speed drive for the former to the latter, so that by this expedient the speed of rotation of the fans may be properly regulated, and the air introduced into the firing chambers in a manner hereinafter more fully specified, it being noted that the outer annular plates 26 may be conveniently tapped, as has been indicated by the reference numeral 61 to permit of the throwing off of any surplus air desired, for various uses.

In the embodiment illustrated, if the rollers are to be adjusted, this may be accomplished by simply stopping the machine, releasing the roller bodies from locking engagement within the slideways 60 and adjusting them as desired. Incidentally, in order to exemplify the great amount of adjustment of which these elements are capable, the rollers shown in the left-hand portion of Fig. 1 have been illustrated as occupying opposite extreme positions, it being obvious, however, that when the machine is operating they will occupy the same vertical planes.

It will now be seen that the annular member 36, including the firing chamber 37, is as has been aforedescribed, divided into two sections. Thus, each firing chamber 37 is sub-divided into two sections of equal length, the division being marked by the central annular plate 26, to each side of which the firing chambers are arranged, and communication between each of the sections of an individual chamber is afforded by providing openings 62, through the plate specified. Now, if a valve 63 is arranged within one of the sections of the firing chamber, as has been shown in Figure 1, and a spark plug, or other suitable igniting element 64 is arranged within the opposite section thereof, it will be appreciated, assuming that a fuel charge has been introduced into the firing chamber, through the valve, subsequent to which the spark plug 64 is actuated, that an initial explosion will take place, within the section of the firing chamber within which the igniting element is positioned, the flame from such explosion flashing through the opening 62, and thus into the opposite section, producing in effect, a double explosion, for a purpose hereinafter more fully brought out.

Thus my turbine includes air fans permitting of the introduction of air, into the firing chambers, which introduction is facilitated by means of inclined side walls 53 and 56, as well as vanes 65, illustrated specifically in Figure 5, and arranged within the interior of each of the drum members, which latter vanes serve to further guide and throw the air into the firing chambers, subsequent to which the valves 63 are actuated, by a cam 66, to permit of the introduction of a fuel charge, as hereinafter more specifically brought out.

Having these operations in mind, reference is had to Figures 13 to 18, and it will be seen that the firing chamber designated by the reference character X is in a position at which the cam 66 is moving out of contact with the valve 63, allowing the same to seat, and at the instant in which the ignition is taking place. The initial force of the explosion will result in an impulse against the rotor 30, and more particularly against one of the side faces of the baffle 34, and the continuation of the explosive forces acting against the vane 33, as has been illustrated in Figure 14. It will also be obvious that the secondary explosion within the firing chamber, i. e. with the explosion in that section remote from the igniting element 64, will cause a further impulse against those portions of the rotor specified, thus forming what might be termed a double impact, for the explosion of each firing chamber. It will also be noted that by virtue of the flaring construction of the ports 35 that the products of combustion will flow through the same and will benefit by the angular discharge to the fullest extent.

It will be obvious that a certain amount of the products of combustion from the explosion specified, will remain within the chamber X, and with a view of thoroughly scavenging this chamber to permit of a repetition of the explosion, it will be noted that the opening 43 of the firing chamber will partially align with the opening 42 of the drum, at a point at which the rear wall of the pocket forming the firing chamber is still beyond the second of the ports 35. Thus the compressed air within the drum 39 will pass into the firing chamber and by virtue of the fact that the upper face of the latter is still in communication with one of the ports 35, it will be obvious that the residue of the products of combustion will be completely thrown from this firing chamber as in Figure 15.

The openings 42 and 43 will now completely align, as has been shown by the position of the chamber preceding the chamber X in Figure 14, and the open face of the pocket being sealed against the inner face of one of the baffles 34, this air will be retained therein in compressed condition subsequent to the passing of the openings out of alignment with each other as in Figure 16. It will be obvious that the cam 66 has been moving in unison with the rotor 30, and subsequent to the sealing of the chamber X against the introduction of upper compressed air, the cam will operate the valve 63 to permit of the introduction of a fuel charge into the firing chamber, as has also been indicated in Figure 16.

The valve 63 will now return to its seated position, as in Figure 17, and it will be seen that the chamber X now contains a charge of highly compressed air to which has been added the necessary amount of volatile fuel, so that upon the parts reaching the position shown in Figure 18, which latter corresponds to Figure 13, an explosion may again be produced, which will result in a duplication of all of the operations hereinbefore described.

It will be noted that it might be desirable to provide means permitting of the regulation of both the admission of air into the firing chambers, other than the fan regulating means, as well as controlling the valves, and referring more particularly to the air control, it will be seen that this may be accomplished by providing a control shaft 67 within the hollow shaft 27, which control shaft mounts, reference being had to Figure 10, hubs 68 corresponding in number to the series of openings provided within the drums, connection being afforded between the shaft 67 and hub 68 by means of transversely extending pins 69, projecting through the shaft 27, and longitudinal slots 70 within the same. Thus a rocking of the control lever 71, affixed to the shaft 67, will result in a corresponding rocking of the hub 68 and radially extending arms 72 secured thereto. These arms may have affixed to their outer ends any suitable type of valve, such as for instance, slides 73 mounted within grooves 74 forming a part of the drums 39, and adjacent each of the openings 42. Thus upon the shaft 67 being rocked, a movement of the slide 73 will result, closing the opening 42 to any desired extent, and accordingly regulating the admission of air through the openings 42 into the openings 43 of the firing chambers 36.

The control lever may be connected to the shaft 67 by any suitable type of clutch mechanism (not shown) so that it will not revolve with this shaft, the adjustment of the parts being effected while the motor is stationary.

With regard to the fuel valve 63, it will be seen, reference being had to Figure 1, primarily, that one of the annular plates 26, preferably the centermost one, is tapped to provide a conduit 75, which conduit is adapted to receive fluid fuel, and in turn transmit it to manifolds 76. These latter in turn, communicate through passages 77 to each of the individual valves 63 so that the fuel will be free to flow, subject to the regulation of the valves into the firing chambers 37.

Each of the valves conveniently includes a head 78 adapted to normally rest upon the seat 79, which latter conveniently forms a part of the valve casing 80. A valve stem 81, which may mount a roller 82 providing antifrictional means for contact with the cam shaft 66, is also preferably extended to provide a head portion 83 adapted to normally bear against a further seat 84 also forming a part of the valve casing 80. The stem 81 of the valve has, as will be noted, reference being had to Figures 11 and 12, what might be termed a two-part stem, primarily including a male and female portion 85 and 86 respectively, the latter slidably projecting into the former, and being normally retained in its maximum retracted position by means of an interposed spring 87 arranged between the head 88 of the female portion 86 of the stem, and the head 83 of the male portion thereof. Inwardly extending flanges 89 conveniently form an integral part of the valve casing 80, and are arranged below the recessed portion 90 of the stem, which latter forms a continuation of the passage 77.

A second spring 91 is introduced between the flange 88 of the female portion of the stem, and the flange 89, so as to normally retain the latter and its associated parts in their fully retracted position, as shown in Figure 11. The head 78 of the valve is formed with a screw threaded opening 92 and the stem is extended in the form of a screw threaded shank 93, which latter projects into the recess or opening 92, and permits of an adjusting of the head 78 to a position at which it seats firmly upon the seat 79, by being rotated, or in other words, moved longitudinal with respect to the stem of the valve.

It will now be seen, in operation, that a certain amount of the volatile fuel will flow through the passage 77 into the space existent between the lower portion of the head 78, and the upper end of the main portion of the female part of the valve stem 81, as well as into the recessed portion 90 of the valve casing 80. Upon the cam 66 now engaging the stem 81 and causing a projection of the latter, the quantity housed within the space existent between the head and stem of the valve will be moved upwardly and, as has been shown in Figure 12, distributed into the interior of the firing chamber with which the valve is associated.

The head 83 would provide a seal, making it impossible for volatile fuel to escape from the valve casing 80 into the interior of the turbine. This seal is further supplemented by the flange 88, and flange 89, so that it will be readily appreciated that no fluid fuel might escape from the interior of the turbine, or into the firing chamber other than at the time that the stem 81 is projected, this latter tendency being guarded against by virtue of the engagement existent between the body of the valve head 78 and the valve casing 80, as well as the seat between these elements. Also the quantity of fuel may be varied by the simple expedient of moving the valve head 78 longitudinal with respect to the stem 81, which is permitted by the screw threaded openings, and shank 92 and 93 respectively. This movement will vary the space provided for the introduction of fuel into the valve ports so that the cool fuel charge may be varied within certain limits.

If it is desired, a second form of valve and operating mechanism illustrated in Figures 20 to 22 may be substituted. In these views it will be seen that the passage 77 connects with a valve casing 94, the latter housing a rotatable valve body 95 formed with a plurality of openings 96. These openings may be continued for any desired length within the body of the valve 95, and are preferably interiorly screw-threaded as at 97. Screw threaded plugs 98 are mounted upon the screw threads 97, and are conveniently provided with certain sealing structure 99, preventing any escape of volatile fuel past them.

Obviously, a movement of the plugs 98 within the openings 96 will vary the cubical area of these openings, and so also regulate the amount of fuel capable of introduction therein. The valve body 95 is provided with an operating stem 100, and fixedly secured to the outer end of the operating stem are a plurality of arms 101, which, in the form illustrated, are arranged in quadrangular relationship to each other, and preferably mount rollers 102, adjacent their outer ends. It is to be noted that the arms 101 are arranged in different planes, and it will be seen that where this type of valve is utilized in lieu of the cams 66, that racks, including a plurality of teeth 103 are provided, which racks are secured to the drums.

Upon one of the teeth engaging the outer ends of one of the arms 101, the latter will be moved through an arc of 90°, and each succeeding tooth arranged in two planes to correspond to the planes of the arms 101 will result in a further movement of the operating stem 100. Thus this operation will permit of a flowing of fuel from the passage 77 into the opening 96 in line with said passage, subsequent to which, as has been illustrated in Figure 21, the plug will be turned so as to seal the opening. Further movement will bring the opening in line with a secondary passage 104 which latter is in communication with one of the firing chambers, which will draw the fuel inwardly into its pocket, subsequent to which the explosion will take place.

It is now to be noted that, with a view of avoiding complication, and too much strain on one side of the apparatus that adjacent firing chambers 37 have their valves and igniting elements arranged in alternate sections of the firing chambers. Thus, as has been illustrated in Figures 1 and 4, undue complication is eliminated, as well as deriving the advantage of having the strain evenly distributed over both sides of the apparatus.

To provide means which will serve to operate the spark plugs 64 arranged in the manner specified, it will be seen that each of the drums may conveniently carry a contact ring, illustrated in Figure 8. This ring conveniently includes a body of insulating material 105, which is provided with recessed portions 106, corresponding in number to the number of cycles permitted by the apparatus in one complete revolution of the rotor. Each of the recesses conveniently partially houses a contact spring 107 which latter has its outer end extending beyond the face of the ring 105 so that upon the outer end of the spring 107 passing the end of the central electrode of the spark plug 64, a contact will result which will cause a spark to be produced between the points of the plug.

With a view of providing a fuel cooling system for the turbine, I conveniently tap the central annular plate 26 so as to provide a pair of inlet openings 108, and outlet openings 109. Cold water is introduced into the openings 108 from whence it flows through conduits into what might be termed, cold water tubes 111. From these conduits, certain of the cool water flows through pipes 112. Adjacent pipes of this latter series extend alternately in opposite directions, the first of the pipes extending between the two half sections of the firing chambers 37, and through the annular member 36, to the outer edge of the same where a cap 113 is provided permitting of the water bridging around the end of one of the firing chamber sections, subsequent to which it passes between the next two firing chamber sections, arranged upon that side of the annular member.

The fluid now passes upwardly and into the hot water pipe 114. It will be understood that, with a view of providing maximum radiation, that the pipes 112 are preferably V-shaped in cross section, as has been illustrated in Figures 2, 4, and 6, so that the maximum of heat will be drawn off by the water. Also as will be noted, reference being had to Figure 6, the cold water pipes 111 and hot water pipes 114 respectively, cross each other upon reaching a horizontal plane, so that the hot water receiving pipe is at all times arranged uppermost, whereby a thermo system is provided insuring an automatic circulation in a proper manner, the hot water passing from the outlet pipes 109.

From the foregoing, it will be appreciated that my turbine includes the following elements which operate, in the embodiment illustrated, in a manner hereinafter described. A stationary member, including a series of firing chambers, a rotor circumscribing said annular member, and operating in unison, and driving a valve controlling member arranged within the annular member. This valve controlling member serves to control the admission of air and fuel into the firing chambers, as well as operating the means producing the ignition.

An air compressor is also provided, which operates in a direction preferably opposed to the direction of rotation of both the rotor and the valve and spark controlling means, this air compressor furnishing the necessary air to permit of the production of a combustible mixture, it being noted that the speed of the air compressor is susceptible to variation, irrespective of the speed of rotation of the rotor and its associated mechanism.

Both the air and fuel controlling valves are capable of adjustment to permit of the desired amount of fluid being introduced into each of the firing chambers, thus allowing of a variation of the speed, and amount of power produced by the turbine. The power may conveniently be drawn from the shaft 27, the rotation of the latter being effected by virtue of the connection existent between the rotor 30 and the drum shaped members, this point of connection being designated by the reference numeral 115, the drum shaped members being secured to the shaft 27 by any suitable means such as disks 116, provided with collars 117 attached to the shaft.

It will further be seen, in the embodiments illustrated, that the firing chambers 37 are thirty two in number, each of which is, as has been afore described, divided into two sections. Also in the embodiment illustrated, eight independent series of ports 35 are provided. Thus it will be appreciated that the turbine, in a single revolution of its rotor, will produce two hundred and fifty six explosions, each of which in turn are to be in the nature of a double explosion, thus giving virtually five hundred and twelve impulses in a single revolution of the rotor.

It will readily be understood, that a motor of this type will be so extremely flexible, as to permit no comparison between the same and reciprocating motors. Also the speed of rotation of the shaft 27 is susceptible to variation from a very slow speed of a revolution to beyond three thousand R. P. M. By this expedient, it will be obvious that should the device be associated with a motor vehicle that the conventional gear shift mechanism may be eliminated, and a practical direct coupling between the power plant and rear axle substituted, in lieu thereof, although it might prove desirable to utilize a clutch.

It will also be seen that by virtue of the adjustment of either of the types of valves proposed, that, as has been illustrated, in Figure 20, the plug 98 is capable of being projected within the openings 96 to a point at which certain of the firing chambers will receive no fuel, thus permitting of the practically instantaneous adaption of the mechanism to produce merely a sufficient explosion to provide smooth running, or a maximum number of impacts as may be desired.

It will be seen that independent of the improved method of introducing air and fuel into the turbine, that the points upon which my motor lends itself to practical adaption are to be predicated upon primarily, the fact that no lubrication is necessary other than in connection with the bearings 28, which is obviously a very simple matter, as the latter may be packed with grease, and further, due to the fact that the air is introduced in the manner described, providing a maximum cooling upon the parts which are liable to be excessively heated, which cooling action is further enhanced by the novel fluid cooling system utilized, together with a feature of throwing off all of the products of combustion within the quickest interval of time, thus permitting a minimum of heat absorption of the parts.

It will be understood that numerous modifications of structure might readily be resorted to, such as for instance providing any suitable number of sections to the firing chamber, rotor, etc. coupling any suitable number of rotors one to the other, together with providing the necessary associated apparatus to increase the power output of the motor.

These modifications are merely given by way of an example, and it will further be understood that numerous departures from structure might readily be resorted to without in the least departing from the spirit of my invention, which I claim as—

1. An internal combustion turbine, comprising a member including a plurality of firing chambers, a rotor adjacent said firing chambers and movable with respect thereto, a rotary air fan positioned to one side of said rotor, rollers, each including a shaft formed with a key way conical members slidably secured to said shaft, and springs interposed between said members for forcing the same in opposite directions, one of said members being adapted to contact with a part of said fan, and means driven by said rotor adapted to contact with the second member of each of said rollers, for transmitting the movement of said rotor to said fan.

2. An internal combustion turbine, comprising a member including a plurality of firing chambers, a rotor adjacent said firing chambers and movable with respect thereto, a rotary air fan positioned to one side of said rotor, rollers, including shafts, formed with key ways, conical members slidably secured upon said shaft, and springs interposed between said end portions for forcing the same in opposite directions, one of said end portions being adapted to contact with a part of said fan, means driven by said rotor adapted to contact with the second end portion of each of said rollers, fixed inclined slide ways, and means rotatably holding each of said shafts, and being mounted within said slide ways.

3. A motor including a shaft, a stator and rotor encircling said shaft and spaced therefrom, an air compressor disposed adjacent to said stator and rotor and being rotatably supported by said shaft, an annular portion forming a part of said rotor, a second annular portion forming a part of said compressor, and means extending between said portions and connected with the same for variably coupling said compressor with said rotor.

4. A motor including a shaft, a stator and rotor encircling said shaft and spaced therefrom, an air compressor disposed adjacent to said stator and rotor and being rotatably supported by said shaft, an annular portion forming a part of said rotor a second annular portion forming a part of said compressor; a connecting member, cone shaped end portions forming a part of said member and bearing against said annular portions and means for shifting said member whereby to variably couple said compressor with said rotor.

5. An internal combustion turbine, comprising an annular member having a plurality of firing chambers in its outer face, a rotor adjacent to said firing chambers, and movable with respect thereto, said rotor circumscribing said annular member, a shaft extending transversely through said annular member and supporting said rotor, rollers secured to said shaft, rotary fans mounted upon said shaft, hollow drums rotatably mounted upon said shaft and secured to said rotor, said drums and firing chambers being formed with communicating openings, said fans being formed with an inclined side wall, a funnel shaped member interposed between the inner edge of said inclined side walls and the drum forming a continuation of said side walls, and means for driving said fan whereby to force air into said drum, the air being subject to increase its compressive action in its passage toward the constricted portion of said member and side walls.

6. An internal combustion turbine, comprising an annular member having a plurality of firing chambers in its outer face, a rotor adjacent to said firing chambers and movable with respect thereto, said rotor circumscribing said annular member, a shaft extending transversely through said annular member and supporting said rotor, rollers secured to said shaft, rotary fans mounted upon said shaft, hollow drums rotatably mounted upon said shaft and secured to said rotor, said drums and firing chambers being formed with communicating openings, said fans being formed with an inclined side wall, a funnel shaped member interposed between the inner edge of said inclined side walls and the drum forming a continuation of said side walls, means for driving said fan whereby to force air into said drum, and means for controlling the cross sectional area of the openings formed in the said drum.

7. An internal combustion turbine, comprising an annular member having a plurality of firing chambers in its outer face, a rotor adjacent to said firing chambers, and movable with respect thereto, said rotor circumscribing said annular member, a shaft extending transversely through said annular member and supporting said rotor, rollers secured to said shaft, rotary fans mounted upon said shaft, hollow drums rotatably mounted upon said shaft and secured to said rotor, said drums and firing chambers being formed with communicating openings, said fans being formed with an inclined side wall, a funnel shaped member interposed between the inner edge of said inclined side walls and the drum forming a continuation of said side walls, means for driving said fan whereby to force air into said drum, and means for controlling the cross sectional area of the air admission openings of said fan.

8. A motor including a shaft, a stator and rotor encircling said shaft and spaced therefrom an air compressor disposed adjacent to said stator and rotor and being rotatably supported by said shaft, an annular portion forming a part of said rotor, a second annular portion forming a part of said compressor a connecting member, cone shaped end portions forming a part of said member and bearing against said annular portions, said cone shaped portions being movable with respect to the body of said member and means for forcing said portions in opposite directions whereby to cause the same to intimately engage said annular portions.

LUCIEN LEOPOLD ARDIN.